J. B. THORNTON, G. H. McDONEL & A. HALE.
Weed-Turner.

No. 169,058.
Patented Oct. 19, 1875.

WITNESSES
E. J. Nottingham
Wm. H. Brereton Jr.

INVENTORS.
John B. Thornton,
George H. McDonel,
Allen Hale.
By Leggett & Leggett
Attorneys.

UNITED STATES PATENT OFFICE.

JOHN B. THORNTON, GEORGE H. McDONEL, AND ALLEN HALE, OF FOSTORIA, OHIO.

IMPROVEMENT IN WEED-TURNERS.

Specification forming part of Letters Patent No. 169,058, dated October 19, 1875; application filed September 10, 1875.

*To all whom it may concern:*

Be it known that we, JOHN B. THORNTON, GEORGE H. McDONEL, and ALLEN HALE, of Fostoria, in the county of Seneca and State of Ohio, have invented certain new and useful Improvements in Weed-Turners as an attachment to a plow; and we do hereby declare the following to be a full, clear, and exact description of the invention, such as will enable others skilled in the art to which it pertains to make and use it, reference being had to the accompanying drawings, which form part of this specification.

Our invention relates to an improvement in weed-turners as an attachment to a plow.

Figure 1:
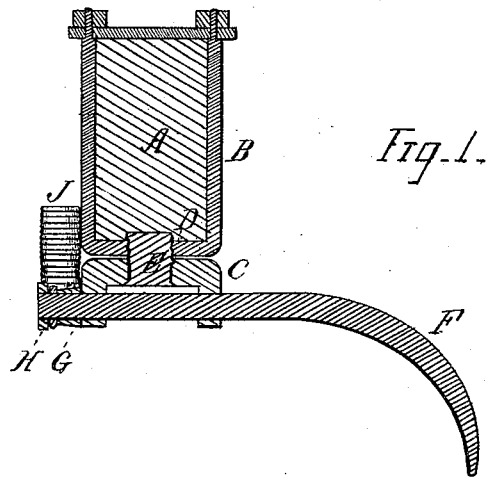
Figure 2:
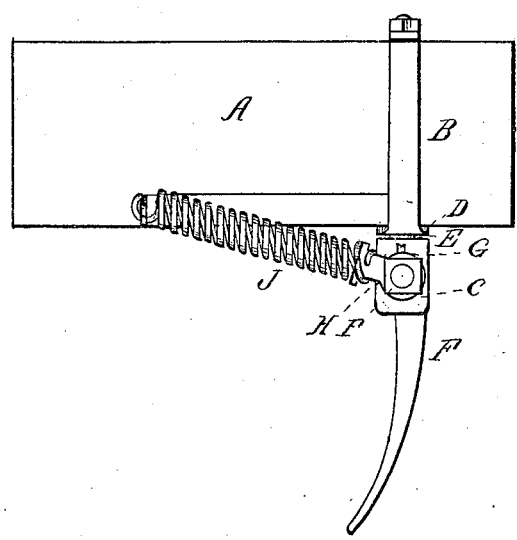

In the drawings, Figure 1 is a cross-section of a weed-turner after my invention; Fig. 2, a side elevation of the same.

Our invention consists in the following parts and combinations, as hereinafter specified and claimed, wherein A is the plow-beam; B, a clevis; C, a swivel-joint; D D', a socket-joint; E, a bolt passing from the swivel through said socket-joint and clevis B, connecting the two. F is a weed-turning hook. G is a clamp-washer. J is a spiral spring attached to the end F' of weed-turner F.

It will be observed that this spring is connected at the inner extremity of the hook F, thereby insuring a better and more advantageous operation than if it were at the long end of the lever. More tightly hugging the plow-beam, and at same time in a plane parallel to the vertical of the plow-beam, it obtains and receives a support therefrom and an advantage which is not found in the former application of springs to weed-hooks.

The weed-turning hook is made to move or slide laterally in such a way that it may be adjusted, by means of the clamp-washer, to any suitable distance, to accommodate a wide or narrow furrow.

The operation is as follows: The different parts, as above mentioned, are combined and united, as shown in the drawings. The hook F impinges against the weeds or grass, or whatever may be in the way, and turns them down and away in such a manner as to place them in a position to be covered under by the earth turned by the mold-board. By the lateral adjustment of the hook a wider or narrower furrow may be accommodated. Pressure against the hook F is relieved and regulated by the combined action of the swivel-joint upon which it turns and a spring attached to its end.

Another advantage of this arrangement is that the hook is enabled to be turned well back against the plow-beam and mold-board, so as to roll under the mold-board in case this face of the plow is turned to the ground. It also provides a means whereby the point of the hook may be turned either downward or in a horizontal direction, as may be desired.

H is a piece placed upon the rear end of the hook F for the attachment of the spring J.

What we claim is—

A weed-turner extending at a right angle beneath the plow-beam, to which it is both pivoted and swiveled, with its shorter arm operating a spiral spring in a plane parallel to the vertical of the plow-beam, while it is laterally adjustable by the clamp-washer G, all constructed and operating substantially as shown.

In testimony whereof we have signed our names to this specification in the presence of two subscribing witnesses.

JOHN B. THORNTON.
GEORGE H. McDONEL.
ALLEN HALE.

Witnesses:
JAMES B. FOX,
ANDREW H. REDDING.